US009061765B2

(12) United States Patent
Vazquez et al.

(10) Patent No.: US 9,061,765 B2
(45) Date of Patent: Jun. 23, 2015

(54) INFLATABLE PASSENGER SEAT ASSEMBLY (75) Inventors: Jose Guillermo Aguirre Vazquez, Chihuahua (MX); Luis Carlos Alvarado Villalobos, Chihuahua (MX); Raul Daniel Flores Aguirre, Chihuahua (MX)

(73) Assignee: Zodiac Seats US LLC, Gainesville, TX (US)

( * ) Notice: Subject to any disclaimer, the term of this patent is extended or adjusted under 35 U.S.C. 154(b) by 628 days.

(21) Appl. No.: 13/293,535

(22) Filed: Nov. 10, 2011
(Under 37 CFR 1.47)

(65) Prior Publication Data
US 2012/0261973 A1 Oct. 18, 2012

Related U.S. Application Data (60) Provisional application No. 61/456,678, filed on Nov. 10, 2010.

(51) Int. Cl.
*A47C 4/54* (2006.01)
*B64D 11/06* (2006.01)
*B60N 2/44* (2006.01)

(52) U.S. Cl.
CPC .............. *B64D 11/06* (2013.01); *B60N 2/4415* (2013.01); *B64D 11/0649* (2014.12); *B64D 11/0647* (2014.12)

(58) Field of Classification Search
CPC ........ A47C 4/54; A47C 27/082; A47C 27/10; B60N 2/4415
USPC ................................ 297/284.6, 284.1, 452.41
See application file for complete search history.

(56) References Cited

U.S. PATENT DOCUMENTS

| 3,393,937 | A | * | 7/1968 | Wehmer | 297/378.1 |
| 3,408,107 | A | * | 10/1968 | Savage | 297/452.41 |
| 3,419,309 | A | * | 12/1968 | Smith | 297/452.41 |
| 4,078,842 | A | * | 3/1978 | Zur | 297/229 |
| 4,339,833 | A | * | 7/1982 | Mandell | 4/541.6 |

(Continued)

FOREIGN PATENT DOCUMENTS

DE 10158876 A1 6/2003
GB 1465698 2/1977

OTHER PUBLICATIONS

International Preliminary Report on Patentability dated May 23, 2013 in Application No. PCT/US2011/060116.

(Continued)

*Primary Examiner* — Laurie Cranmer
(74) *Attorney, Agent, or Firm* — Kilpatrick Townsend & Stockton LLP; Dean W. Russell; Tiffany L. Williams (57) ABSTRACT Described are passenger seat assemblies comprising: at least one seat pan; an inflatable seat adjacent to the at least one seat pan; and at least one inflation system comprising a transport device and a delivery mechanism coupled to the transport device, wherein the transport device is configured to inject an inflating substance into the inflatable seat via the delivery mechanism, wherein the delivery mechanism is coupled to the inflatable seat via an opening. The passenger seat assemblies may further comprise a support structure. The inflating substance may be air. The inflatable seat may comprise at least one structural chamber. The inflatable seat may also have utility apart from the passenger seat assembly.

16 Claims, 5 Drawing Sheets

(56) References Cited

U.S. PATENT DOCUMENTS

| | | | | |
|---|---|---|---|---|
| 4,826,249 | A | * | 5/1989 | Bradbury ................. 297/452.41 |
| 4,915,124 | A | * | 4/1990 | Sember, III ................... 137/223 |
| 5,292,175 | A | * | 3/1994 | Artz ........................... 297/250.1 |
| 5,335,968 | A | * | 8/1994 | Sheridan et al. ........... 297/250.1 |
| 5,516,188 | A | * | 5/1996 | Bruhnke et al. .............. 297/129 |
| 5,558,398 | A | * | 9/1996 | Santos ....................... 297/284.3 |
| 5,879,053 | A | * | 3/1999 | Lux et al. ................... 297/378.1 |
| 6,179,383 | B1 | * | 1/2001 | Ochi ......................... 297/250.1 |
| 6,782,573 | B2 | * | 8/2004 | Odderson ......................... 5/654 |
| 7,052,090 | B2 | * | 5/2006 | Leutert ................... 297/452.41 |
| 7,370,379 | B2 | * | 5/2008 | Zheng ............................ 5/655.3 |
| 7,413,249 | B2 | * | 8/2008 | Leutert ......................... 297/237 |
| 7,748,781 | B2 | * | 7/2010 | Bass .......................... 297/250.1 |
| 8,733,833 | B2 | * | 5/2014 | Dickinson et al. ....... 297/216.11 |
| 2002/0125758 | A1 | * | 9/2002 | Duncan ................... 297/452.41 |
| 2006/0279125 | A1 | | 12/2006 | Leutert |

OTHER PUBLICATIONS

International Search Report and Written Opinion dated Mar. 5, 2012 in Application No. PCT/US2011/060116.

* cited by examiner

INFLATABLE PASSENGER SEAT ASSEMBLY

CROSS REFERENCE TO RELATED APPLICATIONS

This application is related to and claims priority benefits from U.S. Provisional Application Ser. No. 61/456,678, filed on Nov. 10, 2010, entitled "Inflatable aircraft seat." The '678 application is hereby incorporated in its entirety by this reference.

FIELD OF THE INVENTION

The field of the invention relates to passenger seat assemblies. More specifically, it relates to the weight of passenger seats.

BACKGROUND

For most modes of transportation, the lighter the tare weight of the vehicle the better. This is especially true in airline travel. For example, the lighter an aircraft, the less fuel required for travel and the less runway required for take-off and landing. Traditional aircraft seats, however, are typically quite heavy and add a substantial amount of weight to an aircraft, which may include over a hundred seats. In an ideal aircraft, this weight would be eliminated, or otherwise re-allocated for fuel or added amenities. The hindrance of this weight is further exemplified when the seat is unoccupied—an installed seat (and its weight) typically travels with an aircraft regardless of its utilization (i.e., unoccupied seats are not typically removed from aircrafts before take-off). While modern advances have decreased the overall weight of aircraft seats in recent years, an optimal (i.e., near weightless) seat has yet to be achieved. Moreover, an easy and efficient way of eliminating the weight of unoccupied passenger seats has yet to be developed.

SUMMARY

Certain embodiments of the present invention include passenger seat assemblies comprising at least one seat pan; an inflatable seat adjacent to the at least one seat pan; and at least one inflation system comprising a transport device and a delivery mechanism coupled to the transport device, wherein the transport device is configured to inject an inflating substance into the inflatable seat via the delivery mechanism, wherein the delivery mechanism is coupled to the inflatable seat via an opening.

In other embodiments the passenger seat assemblies may further comprise a support structure. In some embodiments the inflating substance may be air. In some embodiments, the transport device may also be configured to remove an inflating substance from the inflatable seat.

In some embodiments, the inflatable seat may also have utility apart from the passenger seat assembly.

DETAILED DESCRIPTION

Embodiments of the invention provide inflatable passenger seat assemblies. While the inflatable passenger seat assemblies are generally discussed for use with aircrafts, they are by no means so limited. Rather, embodiments of the inflatable passenger seat assemblies may be used in connection with any mode of transportation or otherwise as desired.

FIGS. 1-5 illustrate embodiments of an inflatable passenger seat assembly 100. In these embodiments, the inflatable passenger seat assembly 100 may comprise at least one seat pan 102 or at least one seat pan assembly 103, at least one inflatable seat 104, and at least one inflation system 106. In some embodiments, the inflatable passenger seat assembly 100 may further comprise a support structure 108.

Figure 1:
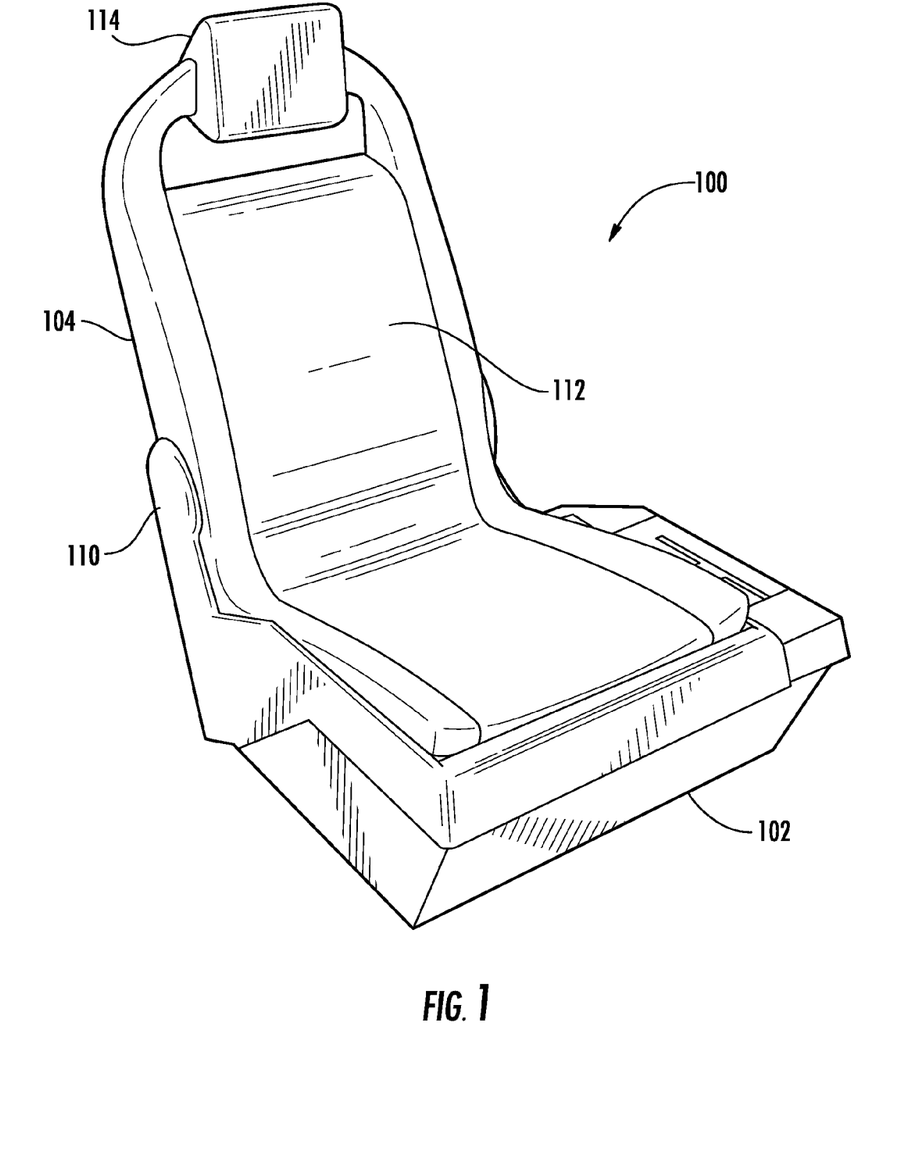
FIG. 1 is a perspective view of an inflatable passenger seat assembly according to certain embodiments of the present invention, wherein the inflatable seat is in an inflated position.
Figure 2:
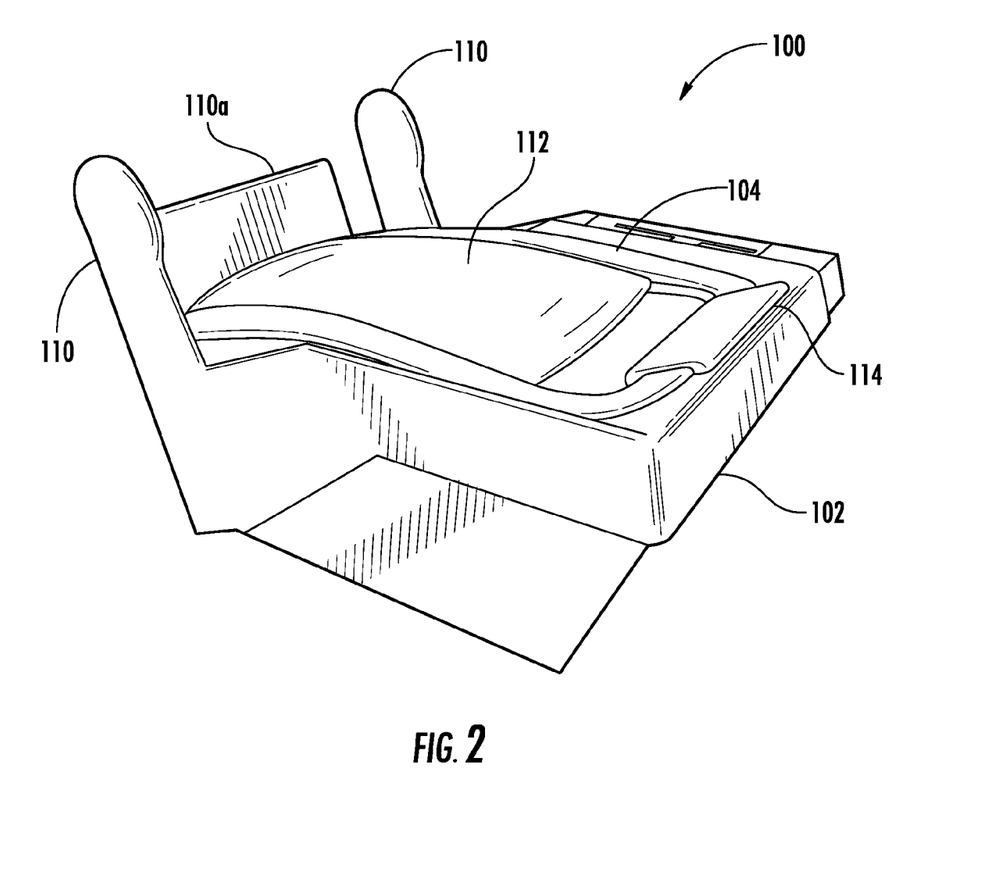
FIG. 2 is a perspective view of the inflatable passenger seat assembly of FIG. 1, wherein the inflatable seat is in a deflated position.

The seat pan 102 serves as the foundation of the inflatable passenger seat assembly 100. In some embodiments, as illustrated in FIGS. 1-2, the seat pan 102 generally supports the inflatable seat 104. In some embodiments, such as the embodiments illustrated in FIGS. 1-2, the seat pan 102 supports the inflatable seat 104 when it is both in an inflated position and in a deflated position. In some embodiments, the seat pan 102 may elevate the inflatable seat 104 off of a floor of an aircraft 101. In some embodiments, such as the embodiments illustrated in FIGS. 1-2, the seat pan 102 may be designed to confine the inflatable seat 104 to a predetermined area. In these embodiments, the structure or shape of the seat pan 102 may influence the shape or position of the inflatable seat 104 during inflation. In some embodiments, as shown in FIGS. 1-2, the structure or shape of the seat pan 102 may also help maintain or support the position of the inflatable seat 104 when inflated. In these embodiments, the seat pan 102 may comprise at least one extended member 110. For example, in the embodiments illustrated in FIGS. 1-2, the extended member 110 of the seat pan 102, including a seat back 110a, as illustrated in FIG. 2, supports the inflatable seat 104 (as illustrated in FIG. 1). The seat pan 102 may be formed of a variety of materials, including but not limited to aluminum, steel, other metallic materials, composite materials, plastics, or other similar materials. In some embodiments, the seat pan 102 may be coupled to the aircraft 101. In these embodiments, the seat pan 102 may be coupled to the aircraft 101 by a variety of manners, including but not limited to an adhesive, bolts, fasteners, screws, and other coupling mechanisms. In other embodiments, the seat pan 102 may be coupled to the support structure 108. In these embodiments, the seat pan 102 may be coupled to the support structure 108 by a variety of manners, including but not limited to adhesives, bolts, fasteners, screws, and other coupling mechanisms.

In some embodiments, the seat pan 102 may also be a part of the seat pan assembly 103, which comprises at least one seat pan 102. The seat pan assembly 103 may likewise comprise at least one extended member 110 to support the inflatable seat 104, which may be adjacent or coupled to the seat pan assembly 103.

The inflatable seat 104 may be inflated to achieve an inflated position, as illustrated in FIG. 1, and may be deflated to achieve a deflated position, as illustrated in FIG. 2. In some embodiments, the inflatable seat 104 is adjacent the seat pan 102 in the inflated position, as illustrated in the embodiments shown in FIG. 1. In some embodiments, the inflatable seat 104 is positioned within the confines the seat pan 102 and/or the extended member 110 in the inflated position. In some embodiments, such as the embodiments illustrated in FIG. 2, the inflatable seat 104 is positioned adjacent to or within the confines of the seat pan 102 when in the deflated position. In some embodiments, one or more pieces or portions of the inflatable seat 104 may be coupled to the seat pan 102. In these embodiments, the inflatable seat 104 may be coupled to the seat pan 102 via any suitable mechanical or chemical fasteners, including but not limited to adhesive, suction, and hook-and-loop fasteners.

The inflatable seat 104 may be formed from a variety of materials, including but not limited to polyvinyl chloride ("PVC") plastic, other plastics, resilient fibers, other materials commonly used for inflation devices, or other similar materials. In some embodiments, an outer surface 112 of the inflatable seat 104 may further comprise one or more layers of a variety of materials, including but not limited to fibers, PVC plastic, or other plastics. In some embodiments, all or a portion of the outer surface 112 of the inflatable seat 104 may be textured. In these embodiments, the outer surface 112 may be textured by or with fibers, for example.

The general shape of the inflatable seat 104 may vary throughout embodiments. In some embodiments, as illustrated in FIG. 1, the inflatable seat 104 may resemble a traditional L-shaped seat in the inflated position. In other embodiments, the inflatable seat 104 may be more curvilinear in the inflated position. In some embodiments, the inflatable seat 104 may also be configured to comprise one or more seat accessories 114 in the inflated position. For example, in the embodiments illustrated in FIG. 1, the inflatable seat 104 comprises a headrest 114 in the inflated position. In some embodiments, the inflatable seat 104 may be configured to comprise one or more arms in the inflated position.

The inflatable seat 104 may be inflated by air, other gases, or other substances that may be injected into and removed from the inflatable seat 104. For example, in some embodiments, gases, liquids, gels, or a combination thereof, including but not limited to aerogel, may also be used to supplement the air or other inflating substance, or in place of the air or other inflating substance.

Figure 3:
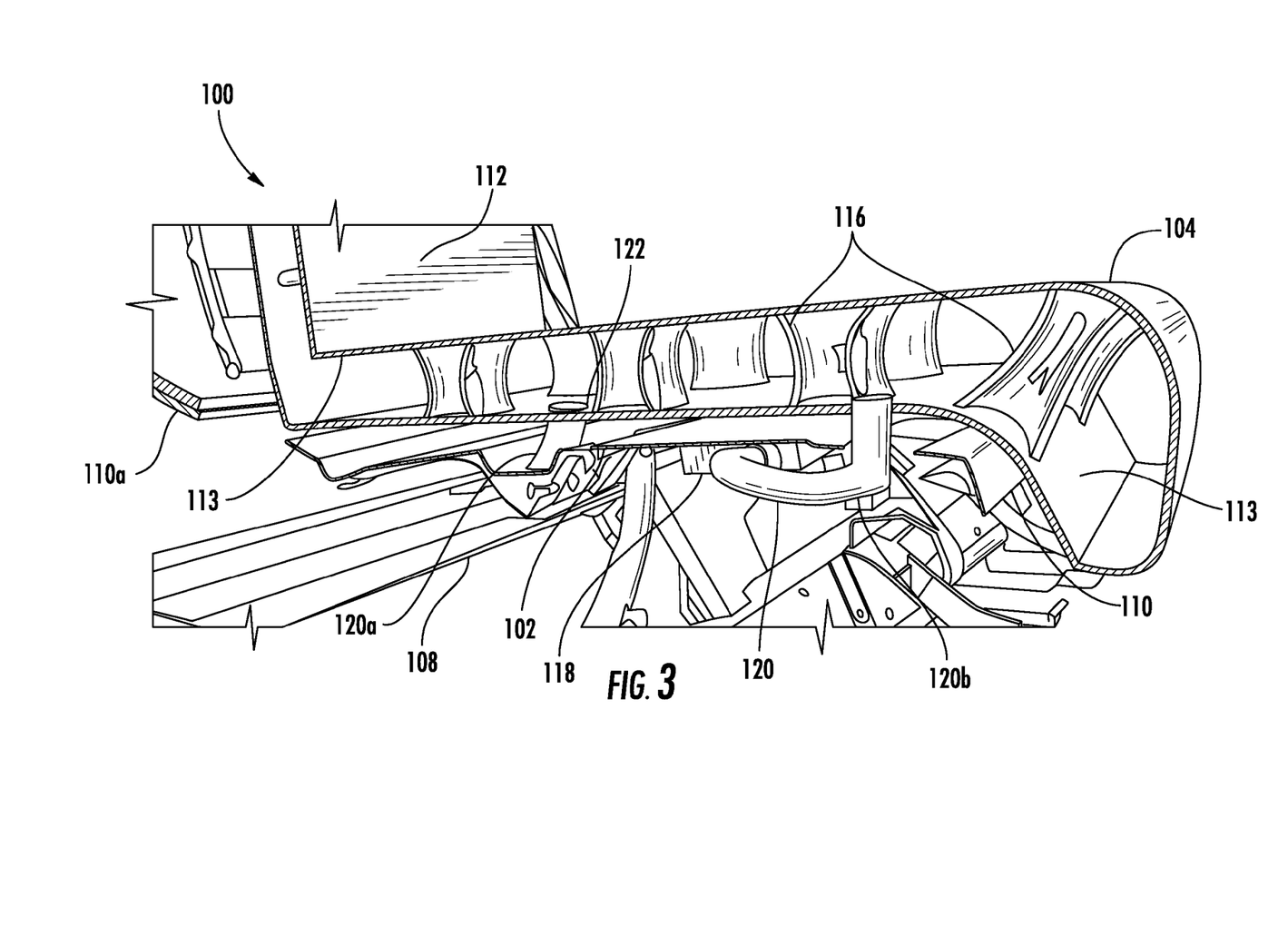
FIG. 3 is a cross-sectional perspective view of an inflatable passenger seat assembly according to certain embodiments of the present invention.

In some embodiments, such as the embodiments illustrated in FIG. 3, the inflatable seat 104 may comprise at least one structural chamber 116. The structural chamber 116 supports the inflatable seat 104 from within the inflatable seat 104 and may assist in inflation of the inflatable seat 104. In some embodiments, the structural chamber 116 may support the shape and/or position of the inflatable seat 104. The structural chamber 116 may be located within the inflatable seat 104 at various positions. In some embodiments, such as the embodiments illustrated in FIG. 3, the structural chamber 116 may be prism-shaped and may extend from an inner surface 113 of the inflatable seat 104 to another inner surface 113. In some embodiments, as illustrated in FIG. 3, the structural chamber 116 may be hollow. The structural chamber 116 may be coupled to the inflatable seat 104. In these embodiments, the structural chamber 116 may be coupled to the inflatable seat 104 by a variety of manners, including but not limited to adhesive, molding, or other suitable mechanism. In other embodiments, the structural chamber 116 may be integrally formed with the inflatable seat 104. The structural chamber 116 may be formed from a variety of materials, including but not limited to PVC plastic, other plastics, resilient fibers, composite materials, or other similar materials.

The air, or other inflating substance, is delivered to the inflatable seat 104 by the inflation system 106. The inflation system 106 may be comprised of a transport device 118 and a delivery mechanism 120. The transport device 118 injects and removes the air, or other inflating substance, to and from the inflatable seat 104. In general, the transport device 118 may be any device that transports air or other inflating substance, including but not limited to turbines, other windmill-type devices, pumps, feeders, drivers, pressurizers, air compressors, and other similar devices. Notably, in some embodiments, a single transport device 118 may inject and remove the air, or other inflating substance, to and from one or more inflatable seats 104.

The delivery mechanism 120 functions as a pathway for the air, or other inflating substance, from the transport device 118 to the inflatable seat 104. The delivery mechanism 120 is coupled to the inflatable seat 104 in a manner such that it may deliver the air or other inflating substance inside the inflatable seat 104. In some embodiments, the inflatable seat 104 comprises an opening 122 by which the delivery mechanism 120 is coupled to the inflatable seat 104. In these embodiments, the delivery mechanism 120 may be coupled to the inflatable seat 104 via any suitable mechanism, including but not limited to compression, suction, adhesion, sealant, and other similar mechanisms. In some embodiments, the transport device 118 may also be directly coupled to or adjacent the seat pan 102 or the inflatable seat 104. In these embodiments, the transport device 118 may be coupled to the seat pan 102 or the inflatable seat 104 via any suitable mechanism, including but not limited to adhesives, bolts, fasteners, screws, and other coupling mechanisms. The delivery mechanism 120 is also coupled to the transport device 118. This coupling may be achieved via any suitable mechanism, including but not limited to compression, suction, adhesion, sealant, bolts, fasteners, screws, and other coupling mechanisms. In general, the delivery mechanism 120 may be formed from a variety of materials, including but not limited to PVC plastic, other plastics, aluminum, other metals, composite materials, fibers, or other similar materials.

Figure 4:
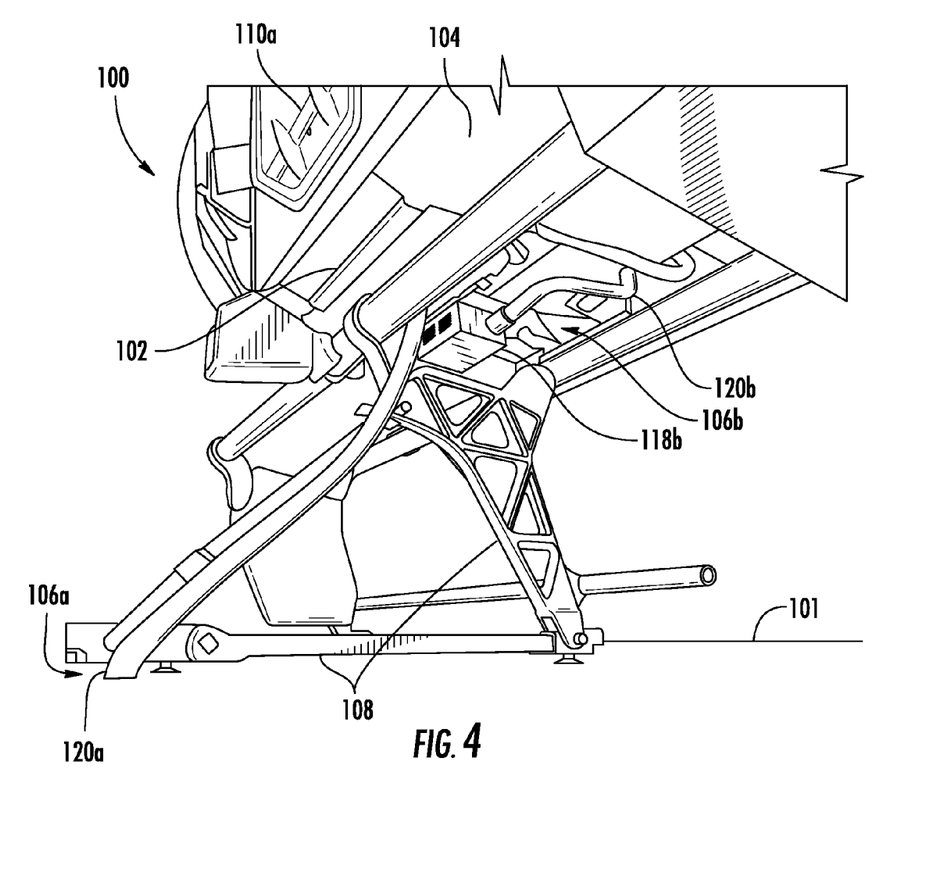
FIG. 4 is a bottom perspective view of the inflatable passenger seat assembly of FIG. 3.
Figure 5:
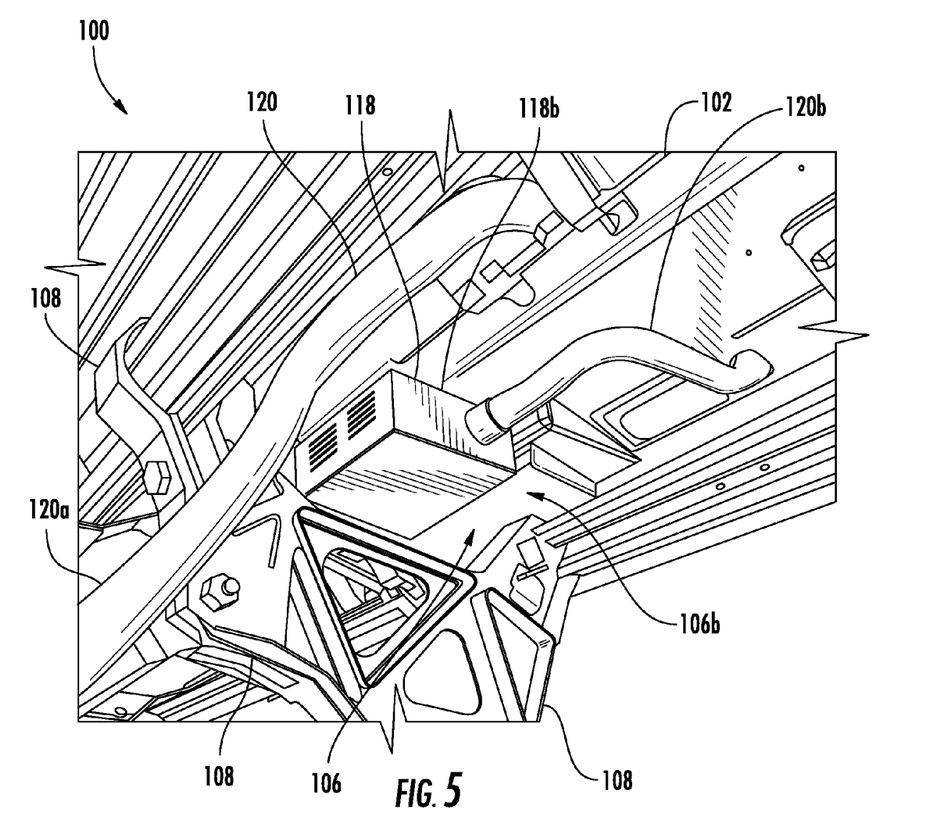
FIG. 5 is a bottom perspective view of the inflatable passenger seat assembly of FIG. 3.

For example, in the embodiments illustrated in FIGS. 3-5, the inflatable passenger seat assembly 100 contains two inflation systems 106. The first is a primary inflation system 106a, in which a flexible tube formed of PVC plastic serves as the delivery mechanism 120a and one or more turbines (not shown) of the aircraft 101 serve as the transport device 118a (not shown). In other embodiments, two or more coupled flexible tubes may serve as the delivery mechanism 120. In these embodiments, the second inflation system 106b is a back-up inflation system 106b, in which a flexible tube formed of PVC plastic serves as the delivery mechanism 120b and a small air compressor coupled to the seat pan 102 serves as the transport device 118b.

In use, the inflatable passenger seat assembly 100 may include the at least one seat pan 102 or the at least one seat pan assembly 103, the at least one inflatable seat 104, and the at least one inflation system 106. The delivery mechanism 120 is coupled to the inflatable seat 104, which may be initially in the deflated position. The inflatable seat 104 is either coupled to or positioned adjacent the seat pan 102. The inflation system 106 is activated, injecting air or other inflating substance into the selected inflatable seat 104 via the delivery mechanism 120. The inflation system 106 can be activated in a number of manners, including but not limited to manually, mechanically, and electronically. The inflatable seat 104 fills with air, or other inflating substance, until a desired inflated position is achieved. In some embodiments, the structural chamber 116 supports this inflation. At the desired inflated position, the inflation system 106 is deactivated. The inflation system 106 can be deactivated in a variety of manners, including but not limited to manually, mechanically, electronically, and automatically (i.e., after expiration of a predetermined amount of time). Once a desired inflated position is reached, the inflatable passenger seat assembly 100 is ready for passenger use. Unoccupied inflatable passenger seat assemblies 100 may remain deflated during transport, which conserves energy and may provide additional personal space for passengers in the occupied inflatable passenger seat assemblies 100.

After passenger use of the inflated inflatable passenger seat assembly 100 is complete, the inflatable seat 104 may be transitioned to the deflated position by the removal of the air or other inflating substance. The inflatable seat 104 may be deflated in a variety of manners, including but not limited to the reverse-application of the inflation system 106 and the opening of a re-sealable aperture 124 (not shown) in the inflatable seat 104.

In embodiments of the inflatable passenger seat assembly 100 comprising the support structure 108, the support structure 108 provides support and foundation for the seat pan 102 and may elevate the seat pan 102 off of the floor of the aircraft 101. In these embodiments, the seat pan 102 is coupled to the support structure 108. This coupling can be achieved in a variety of manners, including but not limited to adhesives, bolts, fasteners, screws, and other coupling mechanisms. In some embodiments, the seat pan 102 and the support structure 108 may be integrally formed. In some embodiments, the transport device 118 may also be coupled to the support structure 108. In these embodiments, the transport device 118 may be coupled to the support structure 108 by a variety of manners, including but not limited to adhesives, bolts, fasteners, screws, and other coupling mechanisms. In some embodiments, the inflatable seat 104 may also be similarly coupled to the support structure 108. The support structure 108 may similarly be coupled to a floor of the aircraft 101. In these embodiments, the support structure 108 may comprise one or more support legs 108, as illustrated in FIGS. 4-5.

In some embodiments, the inflatable seat 104 may have additional utility separate from the inflatable passenger seat assembly 100. For example, in some embodiments, the inflatable seat 104 may be used as a flotation device during an emergency. In these embodiments, the inflatable seat 104 may be removed from the inflatable passenger seat assembly 100. In some embodiments, the inflatable seat 104 may be configured to remain inflated upon removal from the inflatable passenger seat assembly 100. In other embodiments, the inflatable seat 104 may be capable of re-inflation after removal from the inflatable passenger seat assembly 100.

In other embodiments, the inflatable seat 104 may be shaped so as to provide flat surface when inflated. In these embodiments, the inflatable seat 104 may have utility apart from the inflatable passenger seat assembly 100. Such utility may include use of the inflatable seat 104 as a comfortable table for a passenger who might become ill or injured during travel and require medical attention. Such a passenger could be comfortably placed on the flat inflatable seat 104, as oppose to a hard surface of the vehicle, such as the aircraft 101, for medical attention. Other utility may include use of the inflatable seat 104 to transition a commercial area of the aircraft 101 into a transport or supply area of the aircraft 101. For example, in these embodiments, the inflatable seat 104 may enhance the stacking or other similar collection of supply or transport items during travel.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A passenger seat assembly comprising:
   (a) a non-inflatable support structure comprising a bottom pan and a seat back support structure comprising a low-profile height;
   (b) an inflatable seat structure comprising an inflatable seat base and an inflatable seat back comprising an inflated height;
   (c) the inflatable seat structure comprising an inflated position, in which the inflatable seat back is vertically extended to the inflated height and positioned proximate the seat back support structure, wherein the inflated height exceeds the low-profile height so that more than two-thirds of the inflatable seat back is unsupported by the non-inflatable support structure;
   (d) the inflatable seat structure comprising a deflated position, in which the inflatable seat back and the inflatable seat base are deflated and the inflatable seat back is horizontally positioned over the inflatable seat base, wherein the deflated position provides additional personal space for passengers located behind the passenger seat assembly; and
   (e) at least one inflation system comprising:
      (i) a transport device; and
      (ii) a delivery mechanism coupled to the transport device;
   wherein the transport device is configured to inject an inflating substance into the inflatable seat via the delivery mechanism, wherein the delivery mechanism is coupled to the inflatable seat via an opening.

2. The passenger seat assembly of claim 1, wherein the inflating substance is air.

3. The passenger seat assembly of claim 1, wherein the inflatable seat base is coupled to the bottom pan of the non-inflatable support structure.

4. The passenger seat assembly of claim 1, wherein the inflatable seat structure comprises at least one structural chamber.

5. The passenger seat assembly of claim 1, wherein the inflatable seat structure comprises a headrest.

6. The passenger seat assembly of claim 1, wherein the inflatable seat structure comprises a textured outer surface.

7. The passenger seat assembly of claim 1, wherein the at least one inflation system is configured to remove the inflating substance from the inflatable seat.

8. The passenger seat assembly of claim 1, wherein the transport device is an aircraft turbine.

9. The passenger seat assembly of claim 1, wherein the transport device is directly coupled to the bottom pan of the non-inflatable support structure.

10. The passenger seat assembly of claim 1, further comprising two inflation systems.

11. A passenger seat assembly comprising:
   (a) a non-inflatable support structure comprising a bottom pan and a seat back support structure comprising a low-profile height;
   (b) an inflatable seat structure comprising an inflatable seat back comprising an inflated height;
   (c) the inflatable seat structure comprising an inflated position, in which the inflatable seat back is vertically extended to the inflated height and positioned proximate the seat back support structure, wherein the inflated height exceeds the low-profile height so that more than two-thirds of the inflatable seat back is unsupported by the non-inflatable support structure;
(d) the inflatable seat structure comprising a deflated position in which the inflatable seat back is deflated and horizontally positioned over the bottom pan, wherein the deflated position provides additional personal space for passengers located behind the passenger seat assembly; and
(e) at least one inflation system comprising:
  (i) a transport device; and
  (ii) a delivery mechanism coupled to the transport device;
wherein the transport device is configured to inject an inflating substance into the inflatable seat via the delivery mechanism, wherein the delivery mechanism is coupled to the inflatable seat via an opening.

12. A method of inflating a passenger seat assembly, wherein the passenger seat assembly comprises (i) a non-inflatable support structure comprising a bottom pan and a seat back support structure comprising a low-profile height; (ii) an inflatable seat structure comprising an inflatable seat back comprising an inflated height; and (iii) at least one inflation system comprising a transport device and a delivery mechanism coupled to the transport device and the inflatable seat, the steps comprising:
(a) activating the transport device to inject an inflating substance into the inflatable seat structure via the delivery mechanism; and
(b) deactivating the transport device when the inflatable seat structure reaches an inflated position in which the inflatable seat back is vertically extended to the inflated height and positioned proximate the seat back support structure, wherein the inflated height exceeds the low-profile height so that more than two-thirds of the inflatable seat back is unsupported by the non-inflatable support structure.

13. The method of claim 12, wherein the inflating substance is air.

14. The method of claim 12, wherein the transport device is configured to automatically deactivate after a predetermined amount of time.

15. The method of claim 12, further comprising:
(c) activating the transport device to remove the inflating substance from the inflatable seat structure via the delivery mechanism; and
(d) deactivating the transport device when the inflatable seat structure reaches a deflated position in which the inflatable seat back is deflated and horizontally positioned over the bottom pan, wherein the deflated position provides additional personal space for passengers located behind the passenger seat assembly.

16. The method of claim 15, wherein the transport device is configured to automatically deactivate after a predetermined amount of time.

* * * * *